US010116801B1

(12) United States Patent
Christiano et al.

(10) Patent No.: US 10,116,801 B1
(45) Date of Patent: Oct. 30, 2018

(54) CONFERENCE CALL PLATFORM CAPABLE OF GENERATING ENGAGEMENT SCORES

(71) Applicant: Shoutpoint, Inc., Newport Beach, CA (US)

(72) Inventors: Jamie Christiano, Corona Del Mar, CA (US); Samuel Melvin, Costa Mesa, CA (US)

(73) Assignee: Shoutpoint, Inc., Newport Beach, CA (US)

( * ) Notice: Subject to any disclaimer, the term of this patent is extended or adjusted under 35 U.S.C. 154(b) by 0 days.

(21) Appl. No.: 15/383,772

(22) Filed: Dec. 19, 2016

Related U.S. Application Data

(60) Provisional application No. 62/387,413, filed on Dec. 23, 2015.

(51) Int. Cl.
*H04M 3/42* (2006.01)
*H04M 3/56* (2006.01)

(52) U.S. Cl.
CPC ....... *H04M 3/563* (2013.01); *H04M 3/42068* (2013.01); *H04M 3/42221* (2013.01); *H04M 2201/60* (2013.01); *H04M 2203/256* (2013.01); *H04M 2203/303* (2013.01); *H04M 2203/5036* (2013.01); *H04M 2203/5081* (2013.01); *H04M 2203/556* (2013.01)

(58) Field of Classification Search
CPC .......................... H04M 3/563; H04M 3/42068
USPC ............................................. 379/202.01, 158
See application file for complete search history.

(56) References Cited

U.S. PATENT DOCUMENTS

| | | |
|---|---|---|
| 3,210,476 A | 10/1965 | Shaer |
| 3,692,947 A | 9/1972 | Lewis |
| 4,109,111 A | 8/1978 | Cook |
| 4,455,455 A | 6/1984 | Little |
| 4,475,189 A | 10/1984 | Herr et al. |
| 4,541,087 A | 9/1985 | Comstock |
| 4,796,293 A | 1/1989 | Blinken et al. |
| 4,937,856 A | 6/1990 | Natarajan |
| 5,408,526 A | 4/1995 | McFarland et al. |
| 5,440,624 A | 8/1995 | Schoof, II |
| 5,475,747 A | 12/1995 | Bales et al. |
| 5,483,587 A | 1/1996 | Hogan et al. |

(Continued)

FOREIGN PATENT DOCUMENTS

EP         1317123         6/2003

OTHER PUBLICATIONS

U.S. Appl. No. 13/417,124, filed Mar. 9, 2012, Christiano et al.
(Continued)

*Primary Examiner* — William Deane, Jr.
(74) *Attorney, Agent, or Firm* — Knobbe, Martens, Olson & Bear, LLP

(57) ABSTRACT

Various systems and methods for objectively evaluating conference events are disclosed. In some embodiments, the systems and methods include a conference calling platform, such as a conference bridge device, that has a scoring unit. During a conference call, the platform can receive information from the conference system pertaining to the conference call. The scoring unit can use such information to determine an engagement score for the conference call itself and/or for individual attendees. The engagement score and/or information related to the engagement score can be provided to an organizer and/or to individual attendees.

20 Claims, 6 Drawing Sheets

(56) References Cited

U.S. PATENT DOCUMENTS

| | | |
|---|---|---|
| 5,483,588 A | 1/1996 | Eaton et al. |
| 5,495,522 A | 2/1996 | Allen et al. |
| 5,680,392 A | 10/1997 | Semaan |
| 5,699,352 A | 12/1997 | Kriete et al. |
| 5,825,858 A | 10/1998 | Shaffer et al. |
| 5,903,629 A | 5/1999 | Campbell, IV et al. |
| 5,903,637 A | 5/1999 | Hogan et al. |
| 5,916,302 A | 6/1999 | Dunn et al. |
| 5,924,041 A | 7/1999 | Alperovich et al. |
| 5,953,049 A | 9/1999 | Horn et al. |
| 5,978,463 A | 11/1999 | Jurkevics et al. |
| 5,999,208 A | 12/1999 | McNerney et al. |
| 5,999,966 A | 12/1999 | McDougall et al. |
| 6,023,452 A | 2/2000 | Shiragaki |
| 6,067,027 A | 5/2000 | Buer |
| 6,118,864 A | 9/2000 | Chang et al. |
| 6,141,341 A | 10/2000 | Jones et al. |
| 6,178,237 B1 | 1/2001 | Horn |
| 6,195,357 B1 | 2/2001 | Polcyn |
| 6,201,859 B1 | 3/2001 | Memhard et al. |
| 6,275,575 B1 | 8/2001 | Wu |
| 6,282,278 B1 | 8/2001 | Doganata et al. |
| 6,304,648 B1 | 10/2001 | Chang |
| 6,320,944 B1 | 11/2001 | Schlossman et al. |
| 6,327,363 B1 | 12/2001 | Henderson et al. |
| 6,330,321 B2 | 12/2001 | Detampel, Jr. et al. |
| 6,332,153 B1 | 12/2001 | Cohen |
| 6,343,314 B1 | 1/2002 | Ludwig et al. |
| 6,363,079 B1 | 3/2002 | Barzegar et al. |
| 6,370,393 B1 | 4/2002 | Otsuka et al. |
| 6,404,764 B1 | 6/2002 | Jones et al. |
| 6,411,605 B1 | 6/2002 | Vance et al. |
| 6,418,214 B1 | 7/2002 | Smythe et al. |
| 6,421,438 B1 | 7/2002 | Denton et al. |
| 6,424,646 B1 | 7/2002 | Gerszberg et al. |
| 6,453,034 B1 | 9/2002 | Donovan et al. |
| 6,463,051 B1 | 10/2002 | Ford |
| 6,466,550 B1 | 10/2002 | Foster et al. |
| 6,501,739 B1 | 12/2002 | Cohen |
| 6,501,740 B1 | 12/2002 | Sun et al. |
| 6,507,740 B2 | 1/2003 | Shi |
| 6,539,087 B1 | 3/2003 | Walsh et al. |
| 6,580,695 B2 | 6/2003 | Kluck et al. |
| 6,597,667 B1 | 7/2003 | Cerna |
| 6,606,305 B1 | 8/2003 | Boyle et al. |
| 6,625,271 B1 | 9/2003 | O'Malley et al. |
| 6,646,997 B1 | 11/2003 | Baxley et al. |
| 6,657,975 B1 | 12/2003 | Baxley et al. |
| 6,690,771 B2 | 2/2004 | Siemens et al. |
| 6,697,476 B1 | 2/2004 | O'Malley et al. |
| 6,741,697 B2 | 5/2004 | Benson et al. |
| 6,772,436 B1 | 8/2004 | Doganata et al. |
| 6,804,340 B2 | 10/2004 | Howard et al. |
| 6,807,563 B1 | 10/2004 | Christofferson et al. |
| 6,829,349 B1 | 12/2004 | Neale et al. |
| 6,839,416 B1 | 1/2005 | Shaffer |
| 6,839,417 B2 | 1/2005 | Weisman et al. |
| 6,876,734 B1 | 4/2005 | Summers et al. |
| 6,876,736 B2 | 4/2005 | Lamy et al. |
| 6,888,925 B2 | 5/2005 | Spitzer et al. |
| 6,907,449 B2 | 6/2005 | Srinivasan |
| 6,910,081 B1 | 6/2005 | Hammond |
| 6,956,932 B2 | 10/2005 | Ciavolino |
| 6,961,416 B1 | 11/2005 | Summers et al. |
| 6,967,672 B1 | 11/2005 | Huber et al. |
| 6,996,221 B1 | 2/2006 | Baiyor et al. |
| 7,006,455 B1 | 2/2006 | Fandrianto et al. |
| 7,010,622 B1 | 3/2006 | Bauer et al. |
| 7,062,025 B2 | 6/2006 | Summers et al. |
| 7,107,312 B2 | 9/2006 | Hackbarth et al. |
| 7,113,512 B1 | 9/2006 | Holmgren et al. |
| 7,119,828 B1 | 10/2006 | Kizherman et al. |
| 7,151,753 B2 | 12/2006 | Chaney et al. |
| 7,221,951 B2 | 5/2007 | Anvekar et al. |
| 7,257,090 B2 | 8/2007 | Seavers et al. |
| 7,266,091 B2 | 9/2007 | Singh et al. |
| 7,277,697 B2 | 10/2007 | Desai et al. |
| 7,310,320 B2 | 12/2007 | Decker et al. |
| 7,317,791 B2 | 1/2008 | Carlson |
| 7,330,541 B1 | 2/2008 | Surazski et al. |
| 7,346,654 B1 | 3/2008 | Weiss |
| 7,353,251 B1 | 4/2008 | Balakrishnan |
| 7,412,047 B2 | 8/2008 | Nguyen et al. |
| 7,454,460 B2 | 11/2008 | Ivashin |
| 7,483,400 B2 | 1/2009 | Kuusinen et al. |
| 7,483,526 B2 | 1/2009 | Keohane et al. |
| 7,492,730 B2 | 2/2009 | Eshel et al. |
| 7,561,536 B2 | 7/2009 | Roundy et al. |
| 7,580,375 B1 | 8/2009 | Friedrich et al. |
| 7,643,436 B2 | 1/2010 | Provino et al. |
| 7,643,628 B2 | 1/2010 | Hans et al. |
| 7,684,548 B1 | 3/2010 | Rodkey et al. |
| 7,701,926 B2 | 4/2010 | Gavish et al. |
| 7,756,540 B2 | 7/2010 | Tillet et al. |
| 7,852,998 B1 | 12/2010 | Smith et al. |
| 7,929,011 B2 | 4/2011 | Elbaze et al. |
| 7,944,861 B2 | 5/2011 | Smith et al. |
| 7,978,838 B2 | 7/2011 | Rodman et al. |
| 7,985,138 B2 | 7/2011 | Acharya et al. |
| 8,102,984 B2 | 1/2012 | Rodman et al. |
| 8,126,968 B2 | 2/2012 | Rodman et al. |
| 8,140,980 B2 | 3/2012 | Gunasekar et al. |
| 8,144,854 B2 | 3/2012 | Rodman et al. |
| 8,170,191 B2 | 5/2012 | Potekhin et al. |
| 8,223,942 B2 | 7/2012 | Rodman et al. |
| 8,266,535 B2 | 9/2012 | Brown et al. |
| 8,881,027 B1 | 11/2014 | Brown et al. |
| 9,081,481 B2 | 7/2015 | Gilbert et al. |
| 9,165,073 B2 | 10/2015 | Kiraz et al. |
| 9,178,933 B1 * | 11/2015 | Soland ................ H04L 67/306 |
| 2002/0085030 A1 | 7/2002 | Ghani |
| 2002/0106066 A1 | 8/2002 | Swanson et al. |
| 2002/0111153 A1 | 8/2002 | Hartmaier et al. |
| 2002/0118808 A1 | 8/2002 | Kelleher et al. |
| 2002/0118809 A1 | 8/2002 | Eisenberg |
| 2002/0143573 A1 | 10/2002 | Bryce et al. |
| 2002/0169836 A1 | 11/2002 | Hood et al. |
| 2002/0181686 A1 | 12/2002 | Howard et al. |
| 2003/0021400 A1 | 1/2003 | Grandgent et al. |
| 2003/0055899 A1 | 3/2003 | Burger et al. |
| 2003/0074444 A1 | 4/2003 | Ahrens, Jr. et al. |
| 2003/0163526 A1 | 8/2003 | Clarisse et al. |
| 2003/0182374 A1 | 9/2003 | Haldar |
| 2004/0047461 A1 | 3/2004 | Weisman et al. |
| 2004/0051732 A1 | 3/2004 | White et al. |
| 2004/0080504 A1 | 4/2004 | Salesky et al. |
| 2004/0086093 A1 | 5/2004 | Schranz |
| 2004/0101119 A1 | 5/2004 | Malcolm et al. |
| 2004/0107255 A1 | 6/2004 | Ludwig et al. |
| 2004/0119814 A1 | 6/2004 | Clisham et al. |
| 2004/0125933 A1 | 7/2004 | Jun et al. |
| 2004/0218744 A1 | 11/2004 | Nguyen et al. |
| 2004/0228292 A1 | 11/2004 | Edwards |
| 2004/0248552 A1 | 12/2004 | Mazurick et al. |
| 2005/0018826 A1 | 1/2005 | Benco et al. |
| 2005/0034079 A1 | 2/2005 | Gunasekar et al. |
| 2005/0099984 A1 | 5/2005 | Alakoye et al. |
| 2005/0135279 A1 | 6/2005 | Zabawskyj |
| 2005/0169452 A1 | 8/2005 | Prigogin et al. |
| 2005/0187816 A1 | 8/2005 | Smukler |
| 2005/0207357 A1 | 9/2005 | Koga |
| 2005/0286498 A1 | 12/2005 | Rand et al. |
| 2005/0286699 A1 | 12/2005 | Gagle |
| 2006/0056440 A1 | 3/2006 | Khartabil |
| 2006/0062376 A1 | 3/2006 | Pickford |
| 2006/0067250 A1 | 3/2006 | Boyer et al. |
| 2006/0067499 A1 | 3/2006 | Oliveira et al. |
| 2006/0100919 A1 | 5/2006 | Levine |
| 2006/0104433 A1 | 5/2006 | Simpson et al. |
| 2006/0189337 A1 | 8/2006 | Farrill et al. |
| 2006/0210044 A1 | 9/2006 | Widger |
| 2006/0239212 A1 | 10/2006 | Pirzada et al. |
| 2006/0268753 A1 | 11/2006 | Tidwell et al. |
| 2006/0274675 A1 | 12/2006 | Kizhnerman |

(56) References Cited

U.S. PATENT DOCUMENTS

| | | | |
|---|---|---|---|
| 2006/0293073 | A1 | 12/2006 | Rengaraju et al. |
| 2007/0088601 | A1 | 4/2007 | Money et al. |
| 2007/0121859 | A1 | 5/2007 | Smelyansky et al. |
| 2007/0133774 | A1 | 6/2007 | Fujimoto |
| 2007/0208806 | A1 | 9/2007 | Mordecai et al. |
| 2007/0258576 | A1 | 11/2007 | Klein et al. |
| 2007/0294263 | A1 | 12/2007 | Punj et al. |
| 2007/0300165 | A1 | 12/2007 | Haveliwala |
| 2008/0120101 | A1* | 5/2008 | Johnson .................. G10L 15/22 704/235 |
| 2009/0027485 | A1* | 1/2009 | Erhart ..................... H04N 7/144 348/14.12 |
| 2009/0060157 | A1 | 3/2009 | Kim et al. |
| 2009/0074174 | A1 | 3/2009 | Allen et al. |
| 2009/0080640 | A1 | 3/2009 | Waalkes et al. |
| 2009/0086953 | A1 | 4/2009 | Vendrow |
| 2009/0103709 | A1 | 4/2009 | Conway et al. |
| 2009/0222318 | A1 | 9/2009 | Anelevitz et al. |
| 2009/0228323 | A1 | 9/2009 | Ebrahimian |
| 2009/0274279 | A1 | 11/2009 | Reynolds |
| 2009/0310774 | A1 | 12/2009 | Hendricks et al. |
| 2010/0034122 | A1 | 2/2010 | Croy et al. |
| 2010/0070554 | A1 | 3/2010 | Richardson et al. |
| 2010/0226287 | A1 | 9/2010 | Horvath et al. |
| 2010/0260075 | A1 | 10/2010 | Smith et al. |
| 2013/0191485 | A1* | 7/2013 | Spencer ................ H04L 65/608 709/207 |
| 2013/0302767 | A1 | 11/2013 | Hipskind |
| 2014/0022096 | A1* | 1/2014 | Agarwal ........... G06F 17/30702 340/995.27 |
| 2015/0099255 | A1* | 4/2015 | Aslan ....................... G09B 5/08 434/350 |
| 2015/0334313 | A1* | 11/2015 | Chougle ................ H04N 7/152 348/14.07 |
| 2016/0073054 | A1* | 3/2016 | Balasaygun ............. H04N 7/15 348/14.08 |
| 2016/0100133 | A1 | 4/2016 | Kiraz et al. |
| 2016/0105566 | A1* | 4/2016 | Klemm ................. H04M 3/565 379/202.01 |
| 2016/0142674 | A1* | 5/2016 | Travis ..................... H04N 7/15 348/14.07 |
| 2016/0219628 | A1* | 7/2016 | Sharma ............... H04W 76/005 |

OTHER PUBLICATIONS

U.S. Appl. No. 13/417,067, filed Mar. 9, 2012, Christiano et al.
U.S. Appl. No. 14/727,430, filed Jun. 1, 2015, Christiano et al.
U.S. Appl. No. 13/417,112, filed Mar. 9, 2012, Christiano et al.
Arrington, Michael, "Use TokBox to Set Up Instant Video Chat," Aug. 14, 2007, http://techcrunch.com/2007/08/14/use-tokbox-to-set-up-instant-video-chat/.
Macker et al., "IVOX—The Interactive Voice eXchange Application," Naval Research Laboratory, Washington DC, Feb. 20, 1996, 17 pages.
Yocom et al., "Large IP-PBXs: A Well-matched Quartet," Business Communications Review; Jan. 2004, 34,1, ProQuest Technology Collection, pp. 26-40.
ACT Teleconferencing Audio Conferencing and ReadyConnect products, 2 pages.
Brown, Jim, Teleconference bridge links up to 15 callers, Network World, Dec. 21, 1987, 1 page.
Burstyn, Paris H., Encounters of the electronic Kind, Network World, Sep. 29, 1986, 2 pages.
Frontier ConferTech, "Sonata Integrated Teleconferencing System Operator Manual,", Apr. 29, 1998, 15 pages.
Cummings, Joanne, Videoconferencing rollouts abound at ComNet show, Network World, Feb. 8, 1993, 2 pages.
Duffy, Jim, Start-up unveils standards videoconferencing switch, Network World, Jun. 15, 1992, 2 pages.
Ferrari, et al., "Distributed advance reservation of real-time connections," International Computer Science Institute, Mar. 1995, 21 pages.
Herbalife and ACT Teleconferencing Break Guinness World Record, PR Newswire, Mar. 29, 2004, 3 pages.
ACT Teleconferencing Receives Guinness Certification, PR Newswire, Oct. 24, 2004, 2 pages.
Latest conferencing products, Communications News (2001), V. 38 , N. 2 , p. 48, Feb. 2001, 4 pages.
Mace, "CaucusLink lowers cost of conferencing," InfoWorld, vol. 13, No. 44, Nov. 4, 1991, 1 page.
Meyer, Jim, The Portable Lawyer, ABA Journal, Sep. 1991, 8 pages.
PictureTel Corporation, "Concorde 4500 User's Notebook,", 1998, 114 pages.
Polycom Enhances ReadiVoice Reservationless Audio Conferencing Solution for Service Providers, Business Wire, Aug. 17, 2004, 3 pages.
Polycom, Inc., "Polycom Networking Solutions Guide," 8 pages.
Polycom, ReadiVoice Administration & Maintenance Guide, Polycom Guides, Dec. 2006, 321 pages.
Voyant Technologies, "ReadiVoice Intelligent Voice Conferencing System Administration Manual," 2001, 206 pages.
Roseman, et al., "GroupKit: A Groupware Toolkit for Building Real-Time Conferencing Applications," CSCW 92 Proceedings, Nov. 1992, pp. 43-50.
Schooler, Eve M., "A Distributed Architecture for Multimedia Conference Control," USC/Information Sciences Institute, Nov. 1991, 21 pages.
Smith, Paxton J., "Voice Conferencing over IP Networks," Department of Electrical & Computer Engineering, McGill University, Jan. 2002, 140 pages.
Spectel 700 and 780 Platforms, 2002, 2 pages.
Spectel Reserver Application for Lotus Notes 1.2 Installation and Administration Guide, 2004, 74 pages.
Srinivas et al., "MONET: A Multi-media System for Conferencing and Application Sharing in Distributed Systems," CERC Technical Report Series; Research Note, Feb. 1992, 19 pages.
Sullivan, Joe, T.120 conferencing standards ease data sharing, Network World, Jun. 19, 1995, 1 page.
Tele-Town Hall LLC, "Tele-Town Hall a New Way for Elected Officials to Interact Live with Constituents," Nov. 2005, 2 pages.
Vander Veen, Chad, "Phone Home," Mar. 2006, 4 pages.
Morrill, Jim, "Technologies help politicians brave new world," Nov. 2006, 2 pages.
Pasadena Star-News newspaper, Editorial, "Legislative Connection," Mar. 2006, 2 pages.
Tele-Town Hall LLC, Tele-Town Hall Website, Mar. and Apr. 2007, 5 pages.
ConferTech International Announces New Generation Allegro 3.00.0 Conferencing System, Oct. 1996, 3 pages.
The Pulver Report, SIP is Happening, May 6, 1999, 3 pages.
Polycom Introduces Industry-Leading SoundStation2 Conference Phone for Avaya Customers, PR Newswire, Feb. 27, 2006, 2 pages.
Avaya IP Video Telephony Solution Integrates Desktop, Multipoint and Group Video Conferencing from Polycom, PR Newswire, Dec. 13, 2005, 3 pages.
Polycom Announces First Scalable, High Performance Bridges for High Definition Video Conferencing; Polycom Unveils HD Support on MGC Video Bridges for up to 90 Simultaneous HD Calls; Reveals HD Upgrade Plan for VSX 8000 Video Endpoints, Business Wire, Oct. 17, 2005, 3 pages.
Polycom Connects Conference Phones to the PC, Enabling Enhanced Quality for Internet Calling Services, Desktop Video, Business Wire, Sep. 20, 2005, 2 pages.
Macromedia and Avaya to Deliver Integrated Conferencing Solutions to Service Providers and Enterprises; Macromedia Selected for Premier Membership in Avaya Developer Connection Program, Business Wire, Sep. 20, 2005, 2 pages.
ACT Teleconferencing Announces eMeeting Feature Upgrade Global Web Conferencing Service, PR Newswire, Dec. 8, 2004, 2 pages.
Polycom VSX Video Conferencing & Collaboration Wins 9 out of 10 Review from CNE; Outperforms Competition in Video/Voice Clarity, Business Wire, Jul. 25, 2005, 3 pages.
Polycom Completes Award-Winning VSX Video Conferencing Line with New Systems and Enhancements, Business Wire, Jul. 13, 2005, 4 pages.

(56) References Cited

OTHER PUBLICATIONS

Polycom Broadens Integrated Conference Room Solutions with Flexible Options for Any Meeting Environment, Business Wire, Apr. 26, 2005, 2 pages.
Polycom Makes Instant Content Sharing Available to 1.7 Million Conference Phones with Breakthrough Appliance; Polycom QSX Device Enables Simple, Secure, Ad-hoc Content Sharing by Simply Dialing a Polycom SoundStation Conference Phone, Business Wire, Apr. 25, 2005, 3 pages.
Japan Telecom and Polycom Announce Partnership to Deliver Video Conferencing to Small and Medium Sized Businesses, Business Wire, Dec. 8, 2004, 3 pages.
Polycom Sets New Standard in Voice Conferencing with Next Generation Triangular-Shaped SoundStation Conference Phone, Business Wire, Dec. 6, 2004, 3 pages.
Polycom Launches Wireless Conference Phone, Video Display, eWeek, Apr. 19, 2004, 2 pages.
Polycom Expands Unified Conferencing for Service Providers, eWeek, Mar. 15, 2004, 2 pages.
Polycom Enhances VSX Video Conferencing Systems with Improved Video and Audio Quality and Extended Data Sharing, Business Wire, Oct. 20, 2004, 2 pages.
Polycom Delivers Foundation for Next-Gen Conferencing Networks with Introduction of SIP, Business Wire, Oct. 11, 2004, 3 pages.
Polycom Ships SoundStation2W—First Wireless SoundStation Conference Phone, Business Wire, Sep. 27, 2004, 3 pages.
Polycom Enhances ReadiVoice Reservationless Audio Conferencing Solution for Service Providers, Business Wire, Aug. 17, 2004, 2 pages.
Polycom Delivers First 'Surround' Stereo, Conference Phone/Video Integration & SIP Video for Award-Winning VSX Line, Business Wire, Jul. 12 , 2004, 3 pages.
Sonim and Polycom to Demonstrate PoC-Based Conference Calling Application at CTIA, Business Wire, Mar. 22, 2004, 2 pages.
IVCi and Polycom Deliver Turnkey IP Video Conferencing Solution for Small and Medium-Sized Enterprises, Business Wire, May 20, 2004, 2 pages.
Polycom Adds New Best in Class Audio, Video, Web and Data Solutions to the Polycom Office, Expanding Accessibility and Benefits of Rich Media Collaboration, Business Wire, Apr. 19, 2004, 3 pages.
Polycom Announces First Wireless SoundStation Conference Phone, Setting New Standard for Everyday Voice Conferencing, Business Wire, Apr. 19, 2004, 3 pages.
Polycom Redefines Personal Desktop Conferencing, Business Wire, Jul. 7, 2003, 3 pages.
Polycom Announces New Revolutionary Multipoint Conferencing Features Available Through Major Service Providers, Business Wire, May 14, 2003, 3 pages.
Polycom Expands Conferencing (Polycom's SoundStation VTX 1000), eWeek, Mar. 3, 2003, 2 pages.
Genesys Conferencing to Provide Complete Conferencing Solution for Polycom Customers, Business Wire, Apr. 23, 2002, 3 pages.
Polycom Announces SoundStation Premier Interoperable With Nortel Networks Meridian 1 PBX; New SoundStation Premier 550D Is the Industry's First Full-Duplex Voice Conferencing Phone With a TCM Interface to the Nortel Networks Meridian 1 PBX, PR Newswire, Mar. 25, 2002, 2 pages.
Polycom Launches VoicePlus—Breakthrough Multi-Network Voice, Video and Web Collaboration Solution; Polycom to Debut Unified Conferencing Infrastructure Solution for Enterprises and Service Providers at FOSE Government Trade Show, PR Newswire, Mar. 18, 2002, 2 pages.
Polycom, Alcatel Deliver Voice Over IP Conference Phone Solution; Polycom Extends Audioconferencing Leadership Into IP With SoundStation IP 3000 Now Shipping With Alcatel's OmniPCX 4400, PR Newswire, Nov. 27, 2001, 2 pages.
Polycom Introduces Conference-on-Demand for Telephone-Like Video Communications, PR Newswire, Oct. 22, 2001, 2 pages.
Polycom Technology in Cisco's IP Conference Station, PR Newswire, Dec. 13, 2000, 2 pages.
Spectel Announces Launch of Industry's Largest-Ever Conferencing Bridge; New Fully Integrated Confertel 7000 Bridge Offers Up to 4,080 Ports, PR Newswire, Dec. 6, 2000, 2 pages.
Devoney, Take Another Look, Intel's Intel ProShare 550, PictureTel's PictureTel 550, VTEL's Vtel SmartStation and Polycom's ViewStation 512/MP, Sm@rt Reseller, vol. 2, No. 30, p. 48, Nov. 29, 1999, 4 pages.
Polycom ViewStation Software Release 4.0 Now Available to Customers Worldwide; Extends Functionality and Performance Beyond Traditional Videoconferencing With Innovative Ease of Use and Communications Features, PR Newswire, Dec. 22, 1998, 2 pages.
Lucent Technologies and Polycom Announce New Conference Phones, PR Newswire, Jan. 6, 1997, 2 pages.
Polycom's New Desktop and Conference Room Products Raise Audioconferencing Quality to Highest Level, PR Newswire, Sep. 30, 1996, 3 pages.
Northern Telecom's Video Teleconferencing System, The New York Times, p. C3, Jun. 11, 1992, 1 page.
Voice Technologies Group Announces Release of its new VoiceBridge Series II PBX Integration Unit for Northern Telecom Meridian 1 Systems, News Release, p. 1, May 6, 1992, 2 pages.
PBX: Octel Announces Digital Meridian Integration Device (DMID) for Northern Telecom Meridian 1 PBX, Edge, on & about AT&T, vol. 6, No. 164, Sep. 16, 1991, 1 page.
VoiceBridge Integration for Northern Telecom SL1 PBXs, News Release, p. 1, Jul. 8, 1991, 2 pages.
IBM Announces Architecture for Computer/Telephone Communications, Rolm, Siemens, Northern Telecom and AT&T to Provide Links, News Release, p. 1, May 15, 1990, 1 page.
Portway et al., Teleconferencing & Distance Learning, 1994.
Summers, Official Microsoft NetMeeting Book, 1998.
WTS Bureau Systems, Inc., "eMeeting.net", 1999, in 31 pages.
eMeeting.net, Inc., "eMeeting.net: Web enabled conference calls. Powered by TXU Communications," available at http://web.archive.org/web/20030215115634/http://www.emeeting.net/, captured Feb. 2003, accessed Apr. 10, 2015.
eMeeting.net, Inc., "White Paper—eMeeting.net and Associated Technology", believed to be available at least as early as Feb. 2003, in 8 pages.
eMeeting.net, Inc., "eMeeting.net Product Definition", believed to be available at least as early as Feb. 2003, in 3 pages.
Trey Smith, "eMeeting.net Phase 2 Databases", believed to be available at least as early as Feb. 2003, in 3 pages.
Polycom, Inc., "Administrator Guide SoundPoint/SoundStation IP SIP", Version 1.5.x, Apr. 19, 2005, in 166 pages.
Polycom, Inc., "ReadiVoice Release Notes—v2.53.0", Catalog No. 3725-70002-009G2, 2005, in 53 pages.
Polycom, Inc., "ReadiVoice Subscriber Guide", Catalog No. 3725-70007-009F1 (Oct. 2006) v. 3.0, 2006, in 38 pages.

* cited by examiner

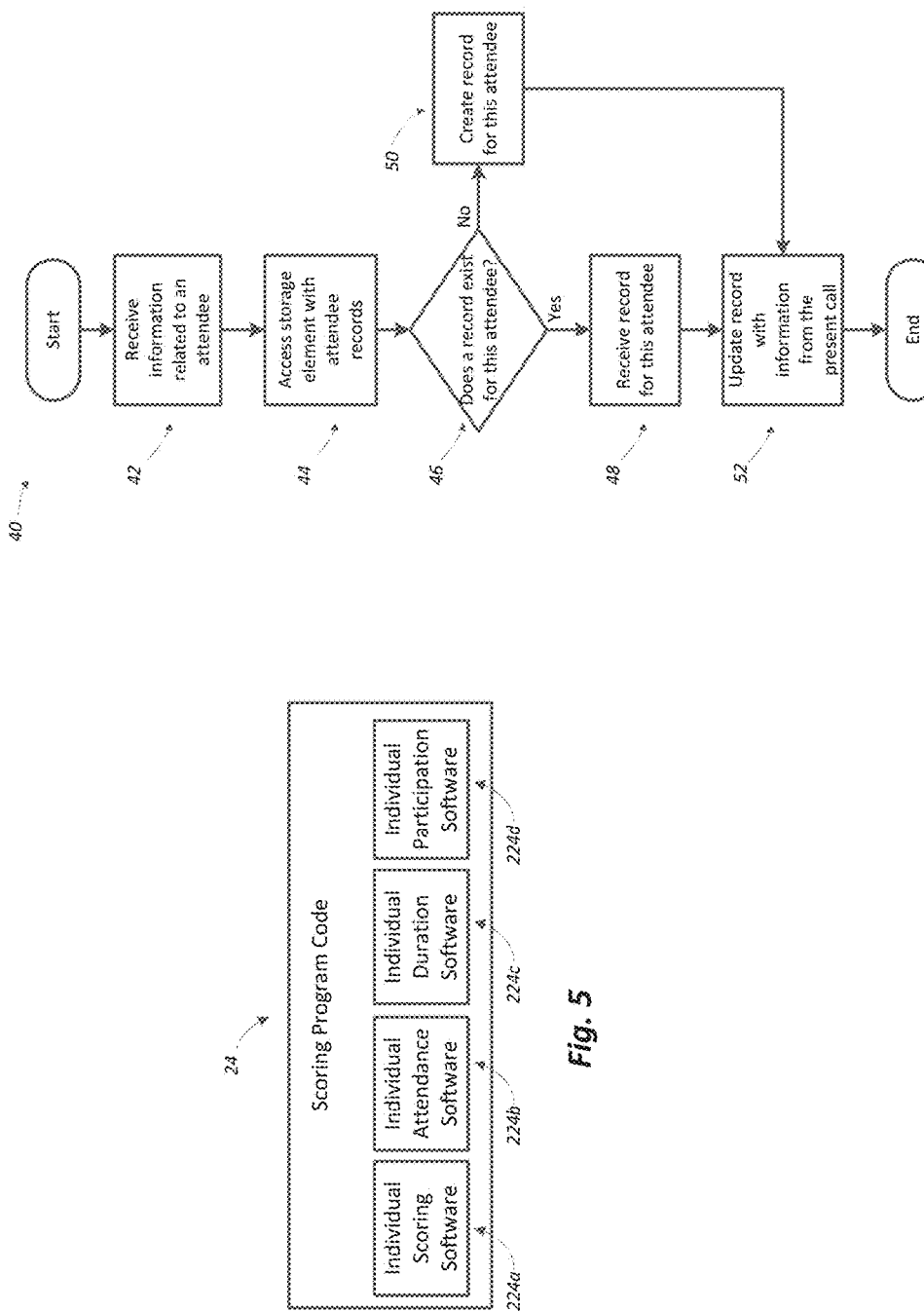

CONFERENCE CALL PLATFORM CAPABLE OF GENERATING ENGAGEMENT SCORES

CROSS REFERENCE

This application claims the priority benefit under 35 U.S.C. § 119 of U.S. Patent Application No. 62/387,413, filed Dec. 23, 2015, the entirety of which is incorporated by reference herein.

BACKGROUND

Field

The present disclosure relates to telecommunication systems and components capable of determining objective evaluations for conference events, such as conference calls, and/or of attendees of such events.

Description of Certain Related Art

Conference calls permit multiple parties to listen to and/or participate in a single telephone conversation. Such calls allow each party to be part of the conversation, while not requiring each party to be physically present in a single location. This can be valuable and convenient in today's increasingly globalized society. It is, therefore, not surprising that conference calls are becoming increasing prevalent. For example, business meetings, seminars, school conferences, shareholder meetings, political campaign communications, and organization member meetings are now routinely conducted as conference calls.

The effectiveness of conference calls has typically been fairly subjective. For example, after conducting a conference call, a business executive may feel that the call went well because the others on the call did not interrupt the executive during the call. But that evaluation may be inaccurate because the others on the call may have found the conversation boring, because the others hung-up before the call was over, or for other reasons. As another example, a political candidate may conclude that a conference call went poorly due to a small number of attendees. However, that small number of attendees may have included highly sought-after voters (e.g., independents), and thus the call may have actually been successful in disseminating the candidate's information to a desirable audience. Thus, as illustrated by these examples, subjective evaluations of conference calls can be inefficient and/or can lead to an incorrect conclusion.

SUMMARY OF CERTAIN FEATURES

It would be beneficial to objectively determine the effectiveness of conference calls. This could allow an organizer of a conference call to understand whether the conference call was a productive use of time and resources, to know whether the information on the conference call was adequately disseminated, and/or to evaluate the skills of the presenter on the call. Moreover, such objective criteria can provide a basis for a conference call provider to determine the value of the conference call, and can price the conference call accordingly.

One way to objectively evaluate aspects of a conference call is to determine the extent of attendee engagement on the call. This can include monitoring various actions by, or attributes of, the attendees on the call. For example, attendee engagement can be determined based on the number of attendees on the call and the duration of time that the attendees are on the call. Engagement can also be based on participation by attendees, such as whether attendees asked questions during the call, participated in polls, accessed instructions and/or help menus, invited others to join the call, or otherwise.

In various embodiments, a conference call management system for determining attendee engagement during a conference call includes a conference platform having scoring unit. The conference platform can provide conference calling functionality. For example, the conference platform can include a conference bridge device. During a conference call, an organizer (e.g., a host) and attendees each place a call into the conference platform, which links the calls to provide a group conversation. Throughout some or all of the conference call, the scoring unit can receive information from other components of the conference platform. The information can relate to the attendees, such as the aspects described above. The scoring unit can use such information to determine an engagement score for the conference call itself and/or for individual attendees, as is discussed in more detail below. The engagement score (and details related to the basis for that score) can be provided to the organizer and/or to individual attendees, such as via a graphical user interface, a summary email, or otherwise. The organizer and/or attendee can use the engagement score as an objective basis on which to evaluate the conference call.

The system can use the engagement scores in various ways. For example, the scores of individuals can be used to automatically rank those who have pending questions. This can allow the host to readily give preference to the questions of those who are the most engaged. In some variants, the system uses the individual's scores to select and/or rank users to invite to attend future calls. For example, the system can prioritize the users having the highest cumulative or aggregate participation scores and provide invitations to future conference calls to those users.

Neither the preceding summary nor the following detailed description purports to limit or define the scope of protection. The scope of protection is defined by the claims.

BRIEF DESCRIPTION OF THE DRAWINGS

The above-mentioned, and other features of the embodiments disclosed herein, are described below with reference to the drawings of the embodiments. The illustrated embodiments are intended to illustrate, but not to limit, the scope of protection. Various features of the different disclosed embodiments can be combined to form further embodiments, which are part of this disclosure.

FIG. 5 illustrates another embodiment of the scoring unit of FIG. 2 that is adapted for determining an engagement score for individual attendees of a conference call.

FIG. 6 illustrates a process for updating records related to an attendee's attendance on a conference call.

DETAILED DESCRIPTION OF CERTAIN EMBODIMENTS

This disclosure describes certain embodiments that determine engagement scores for conference events and/or participants. Various embodiments are described in the context of a conference call, due to a particular utility in that context. However, the present disclosure is not limited to use only with conference calls. Indeed, certain aspects of the present disclosure can be used in other contexts as well, such as during video conferences, web meetings, in-person meetings, or otherwise.

I. Overview (FIGS. 1 and 2)

Figure 1:
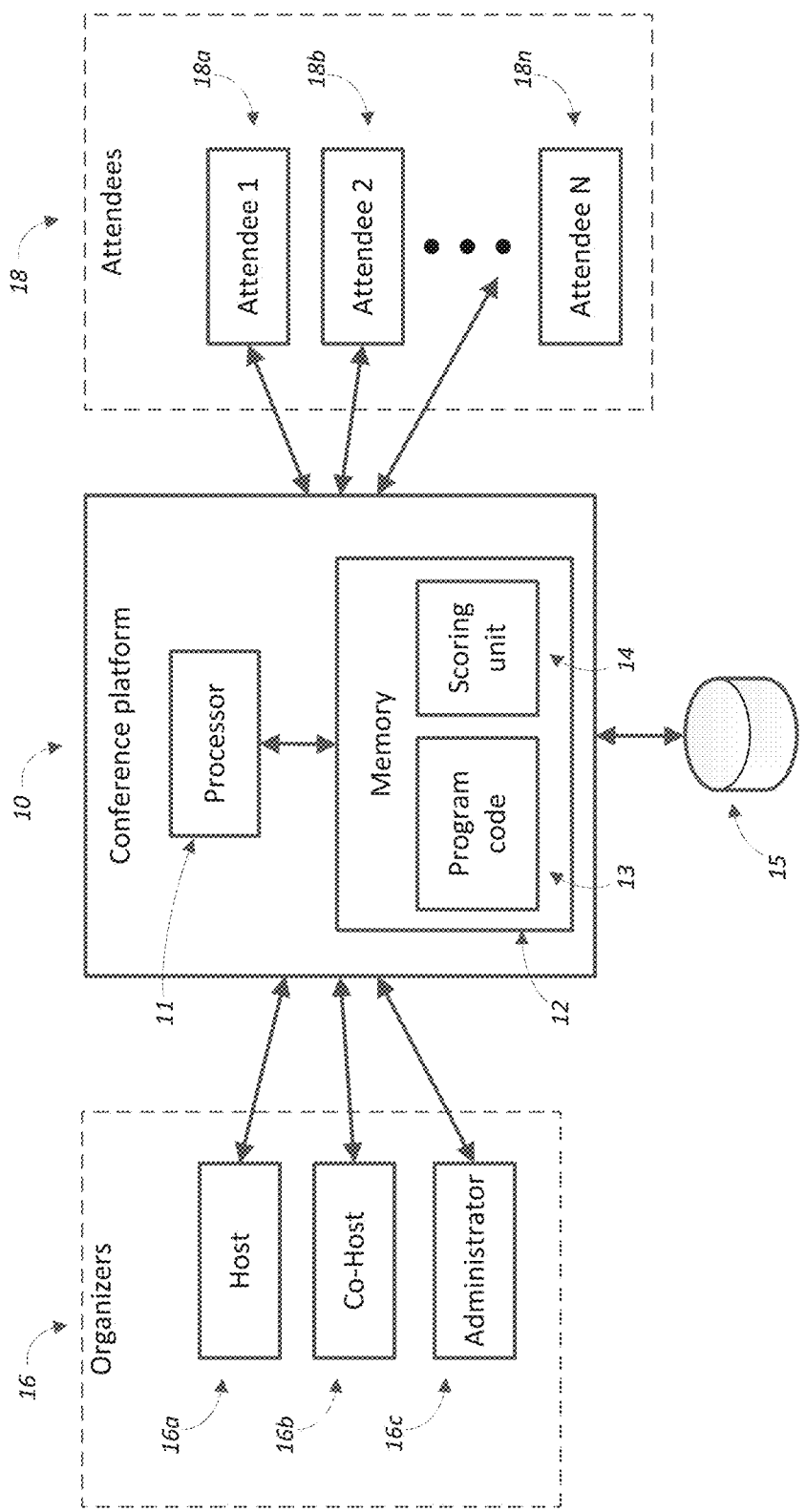
FIG. 1 illustrates an embodiment of a conference call system, including a scoring unit in communication with a conference platform.
Figure 2:
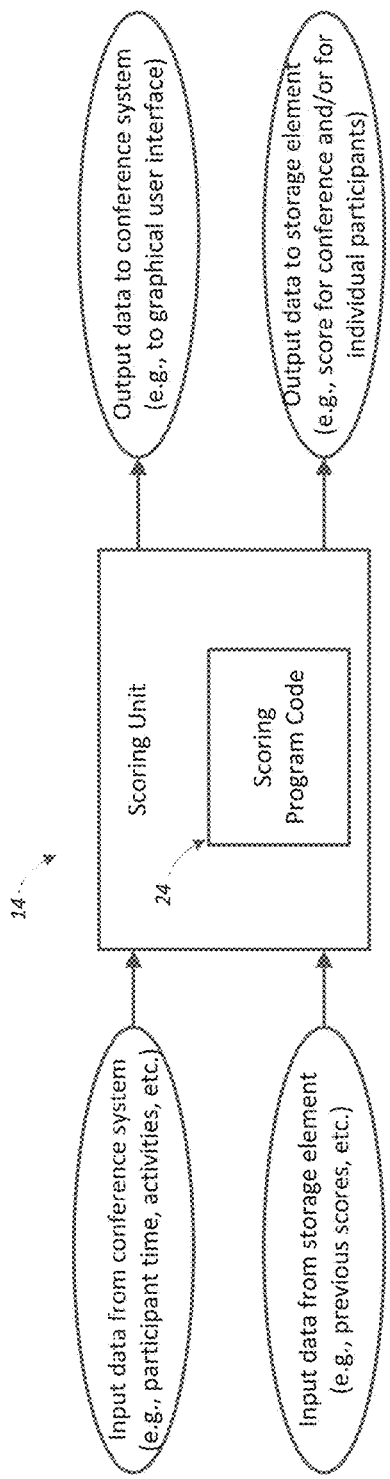
FIG. 2 further illustrates the scoring unit of FIG. 1.

FIGS. 1 and 2 illustrate an example embodiment of a computer-based system that determines engagement scores for conference calls. The system can include a conference platform 10 implemented as a computing system that comprises one or more computing devices programmed with executable program code. For example, the platform 10 can include a processor 11 coupled with a memory 12. The memory 12 includes the program code 13, which can be implemented on a computer-readable non-transitory medium. The processor 11 can execute the program code 13 to perform various operations, such as connecting phone calls. The platform 10 can include all of the necessary hardware and software to provide linking communication between telephone calls of various users, thereby facilitating a group conversation by the users. For example, the platform 10 can include a conference bridge or other equipment for linking telephone lines. More information related to an example conference bridge can be found in U.S. Pat. No. 6,178,237, filed Dec. 24, 1997, the entirety of which is incorporated by reference herein. In some embodiments, the platform 10 can host, or communicate with a separate computing system that hosts, a website that enables user interface, such as enabling users to submit and view questions, responses, etc.

As also illustrated in FIG. 1, the platform 10 can include a scoring unit 14. The scoring unit 14 can be implemented as an additional program module that runs on the platform 10. Alternately, the scoring unit 14 can be implemented on a separate computing device in communication with the platform 10 and/or with a storage system 15. The processor 11 can execute and/or communicate with the scoring unit 14 to determine and/or receive various engagement scores. As described in more detail below, the engagement scores can pertain to the conference call itself and/or to individual attendees of the conference call.

The conference call typically includes one or more organizers 16 and one or more attendees 18. The organizers 16 are the persons or groups who arrange and/or lead the conference call. For example, some organizers 16 may include a host 16*a*, co-host 16*b*, administrator (e.g., producer) 16*c*, or other persons. The host is typically the leader of the conference call. In some cases, the host is the primary presenter and the person who speaks the most on the conference call. Alternatively, the host may play the role of a moderator and other persons on the conference call may play a primary speaking role. The co-host generally serves a similar purpose as the host, such as by playing a lead role in the conference call. The administrator is typically a person who aids in the execution of the conference call and may or may not serve a speaking role on the call. For example, the administrator may serve a behind-the-scenes function, such as in answering technical questions, helping the host or others in presenting the information on the conference call, or otherwise. The organizers 16 normally access the conference call by dialing a specified phone number and entering an access code. An organizer password or pin number may also be required.

The attendees 18 of the conference call are typically those persons or groups who are not organizers. As shown in FIG. 1, the attendees 18 can include a plurality of attendees 18, such as attendee 1 18*a*, attendee 2 18*b*, and continuing to attendee N 18*n*. Generally, the attendees 18 have speaking privileges during the conference call, and thus can be part of the group conversation. However, on some conference calls, the attendees 18 serve as spectators only and do not have speaking privileges. The attendees 18 normally access the conference call by dialing a specified phone number and entering an access code. An attendee password or pin number may also be required.

To arrange a conference call, one of the organizers 16 typically sends a communication, such as an email, to prospective attendees 18. The communication normally includes information such as the telephone number for the conference call, the time and date, topic, password or pin number, etc. At the appointed time and date, the organizers 16 and attendees 18 access the conference platform 10 by calling the telephone number for the conference call, such as via a standard telephone line, voice over internet protocol, or otherwise. The conference platform 10 then links the individual calls into a group conversation and the conference call begins. In some cases, the attendees 18 may be kept on hold until at least one organizer 16 joins the call.

During the conference call, or afterward, the scoring unit 14 can communicate with the other components of the conference platform 10 to receive information related to the conference call and/or to the persons on the call. For example, the scoring unit 14 can receive information related to the number of persons on the call, the caller type (e.g., host, co-host, attendee, etc.) for each of the persons on the call, the time that each of the persons entered and exited the call, and/or other aspects. The scoring unit 14 can receive information related to individual attendees, such as the phone number from which they are accessing the call, the identification number they entered to access the call, or otherwise. As described below, the scoring unit 14 can use such information in determining the engagement score(s).

As illustrated in FIG. 1, the platform 10 can communicate with a storage system 15, such as a database. The storage system 15 includes records with information about previous conference calls. For example, the records can include previous conference calls' dates, times, durations, titles, topics, attendees, and/or other aspects. The records can also include information related to the performance of the previous conference calls, such as the number of attendees, the number of questions, feedback from attendees, and/or other information. Further, the records can include past scoring information. For example, as discussed below, the storage system 15 can include a log of engagement scores from previous conference calls. This can facilitate determining changes in the scores over the course of multiple conference calls and/or comparisons between conference calls.

The records can include attendance information. The attendance information can be organized by conference call, such as a list of the organizers 16 and attendees 18 that accessed the previous conference calls. Additionally, or alternately, the records can be organized by attendee 18. For example, each attendee 18 can have a record with information about that attendee 18, such as the attendee's phone number, identification number, or other identifying information. The records can also include an engagement score for some or all of the individual attendees 18. This can allow the engagement score for an individual attendee 18 to be accessed and updated when the attendee 18 attends subsequent conference calls. For example, the system can maintain event-specific and/or aggregate (e.g., average) scores for specific individuals.

The scoring unit 14 can identify those callers on the present call that were callers on previous conference calls. As noted above, the scoring unit 14 receives, from other components of the conference platform 10, information related to individual callers on the present call, such as the phone number from which they are accessing the call, the identification number they entered to access the call, or otherwise. Similarly, the scoring unit 14 can receive, from the storage system 15, information related to individual callers from previous calls, such as the phone number from which they accessed the call, the identification number they entered to access the previous conference call, or otherwise. The scoring unit 14 can use such information from the conference platform 10 and the storage system 15 to identify those callers on the present call that were on previous conference calls. For example, the scoring unit 14 can determine which phone numbers (or identification code or other data) of the attendees 18 of the current call match the phone numbers (or identification code or other data) in the records for attendees 18 of previous calls. When a match is found, the scoring unit 14 can correlate the attendee 18 of the current call with the appropriate record from previous calls.

As shown in FIG. 2, the scoring unit 14 includes scoring program code 24, which can be included in the memory 12 and can be executed by the processor 11 to perform the various engagement scoring determinations and other operations. Alternately, the scoring unit 14 can be implemented as a separate computing device. For example, the scoring unit 14 can include a processor and memory that can execute the scoring program code 24. As is discussed in more detail below, the scoring program code 24 can include an algorithm to facilitate determining an engagement score for the conference call and/or for attendees of the conference call.

The scoring unit 14 can receive one or more inputs, such as data from other components of the conference platform 10. This can include attributes such as the duration of some or all of the attendees' presence on the conference call, activities during the conference call (e.g., invite a friend to join the conference call, started a sub-group, etc.) or otherwise. As shown, the scoring unit 14 can include an input from the storage system 15, such as the previous scoring data for some or each individual attendees or otherwise.

As also shown in FIG. 2, the scoring unit 14 can output data to other components of the conference platform 10 and/or the storage system 15. For example, the scoring unit 14 can output an engagement score to the processor 11, which in turn can communicate the engagement score to a graphical user interface accessible by the organizers 16. This can allow organizers 16 (e.g., the host) to view the engagement score for the call overall and/or for individual attendees 18 in substantially real time, which can aid the organizers 16 in conducting the conference call. For example, if the score for the call is observed to drop precipitously and/or below a certain level, then the organizers 16 can take action to try to increase the score again, such as by moving to a different topic, asking for audience feedback, or otherwise.

To aid such functionality, in certain embodiments the score is based solely or primarily on the activity occurring over a limited time window, such as approximately the most-recent: 15 seconds, 30 seconds, 1 minute, 2 minutes, values between the aforementioned values, and other values.

Output data from the scoring unit 14 can be communicated to the storage system 15. For example, the engagement score for the present call itself and/or for the individual attendees 18 of the present conference call can be communicated to the storage system 15. The storage system 15 can record the output data so that the scoring unit 14 can access it in connection with future conference calls.

As noted above, the scoring unit 14 determines various types of engagement scores. A first type of engagement score is an engagement score for a conference call itself. As discussed in more detail below, this can include features such as the number of attendees 18 on the call, the average length of time an attendee remained on the call, the number of questions asked by attendees 18 during the call, whether attendees invited others to participate on the call, and the number of such invitations sent and/or accepted or otherwise.

A second type of engagement score is an engagement score for individual attendees 18 of the call. For example, the scoring unit 14 can determine a score based on an attendee's 18 duration on the call, whether the attendee 18 participated such as by asking a question or participating in a vote, whether the attendee 18 accessed the help or instruction menu on the call, the method by which the attendee 18 accessed the call (e.g., telephone or web), whether the attendee 18 invited another to the conference call or set up a sub-group on the conference call, whether the attendee 18 provided feedback about the call or otherwise.

II. Determining an Engagement Score for the Conference Call (FIGS. 3 and 4)

As indicated above, it can be advantageous to determine an engagement score for a conference call itself. This can aid organizers in objectively evaluating the conference call and/or can provide a way to objectively compare the present call with previous conference calls. Furthermore, determining a score for the call itself can provide a basis for assessing the value of the call, which can aid in determining the price for servicing the call. In certain such implementations, the conference platform 10 uses the event-level engagement score to determine an amount or rate to charge for the conference call. The amount or rate can be a function of the score, such as linear function, step function, exponential function, or otherwise. For example, a conference call with an engagement score of A may cost the organizer $X and an engagement score of B may cost the organizer $Y, where B is greater than A and Y is greater than X. Similarly, platform 10 can use the engagement score to vary an amount or rate charged to advertisers who advertise on the call or on a web site associated with the call. Thus, various embodiments of the platform 10 can help conference call service providers in pricing conference call services and/or can help organizers in budgeting for conference call costs.

Figure 3:
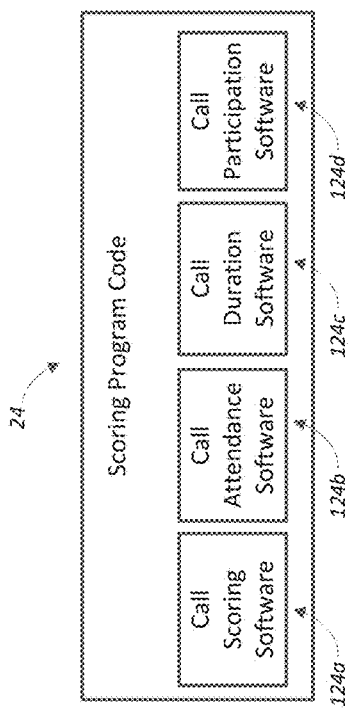
FIG. 3 illustrates an embodiment of the scoring unit of FIG. 2 that is adapted for determining an engagement score for a conference call.
Figure 4:
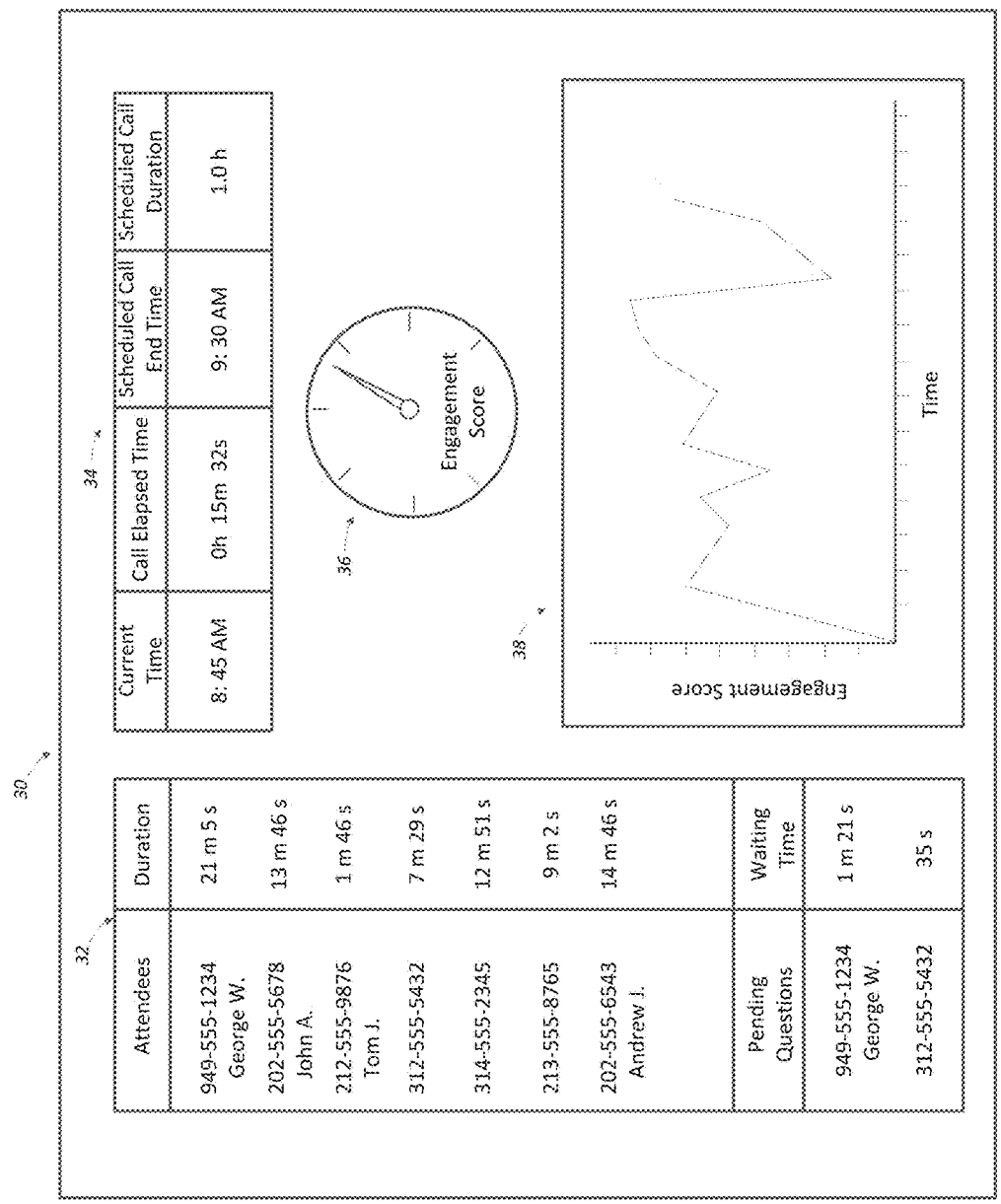
FIG. 4 illustrates an example graphical user interface that receives an output from the scoring unit of FIG. 2.

In the embodiment shown in FIG. 3, the scoring program code 24 is adapted to determine an engagement score for the conference call. The program code 24 includes call attendance software 124b, call duration software 124c, and call participation software 124d. Further, the program code 24 includes call scoring software 124a, which includes an algorithm (discussed further below) to determine the engagement score.

The scoring unit 14 can receive inputs regarding a variety of information, which can be used in determining the engagement score for the conference call. For example, the scoring unit 14 may receive inputs related to the attendance (e.g., the number of attendees, the number of attendees from prior conference calls, etc.), duration (e.g., of the call, of attendance by individual callers, etc.), and/or participation (e.g., how and whether attendees interface with the call, such as by asking questions or providing feedback). Some of the information can be positive, which can positively impact the engagement score (e.g., the score can increase). Some of the information can be negative (e.g., explicit negative feedback), which can negatively impact the engagement score (e.g., the engagement score can decrease).

Several example aspects that can be included in the call engagement score determination are discussed below.

A. Attendance on the Call

In some embodiments, the attendance on the call affects the engagement score for the call. This is because a larger number of attendees can indicate an increased level of interest regarding the topic and/or organizer of the call, which can correlate to more engagement. Conversely, too small a number of attendees can indicate a reduced level of interest regarding the topic and/or organizer of the call, which can correlate to less engagement. Typically, the attendance software 124b can determine or receive, from other components of the conference platform 10, the number of attendees on the call. The attendance software 124b can use that information to determine an attendance value for the call, which can be provided to the scoring software 124a for use in determining the engagement score.

The attendance software 124b can determine the attendance value using various ways. For example, the attendance value can be based on the instantaneous number of attendees on the call. Alternately, the attendance value can be based on the total number of attendees that accessed the call. In some implementations, the attendance value is based on the number of attendees per unit of time, such as per minute.

In some embodiments, the attendance value is tied to a threshold attendance. For example, the attendance value can increase if the number of attendees is greater than or equal to the threshold value, such as 3, 5, 10, 15, 20, 50, 100, values between the aforementioned values, or other values. In some embodiments, the attendance value decreases if the number of attendees is less than the threshold value, such as 2, 4, 6, 10, 20, values between the aforementioned values, or other values.

In certain variants, the attendance value changes (e.g., linearly or exponentially) as a function of the number of attendees. In some embodiments, the attendance value varies as a step function. For example, the attendance value can vary a first amount when the number of attendees is at or between X and Y (e.g., 1 and 3), can vary a second amount when the number of attendees is at or between X' and Y' (e.g., 4 and 10), and can vary a third amount when the number of attendees is at or between X" and Y" (e.g., 11 and 25).

B. Duration of the Call

The temporal length of the call can affect the engagement score of the call. A longer duration may indicate an increased level of interest regarding the topic and/or organizer of the call, which can correlate to more engagement, and a shorter duration of the call may indicate a reduced level of interest regarding the topic and/or organizer of the call, which can suggest less engagement.

Typically, the call duration software 124c determines or receives, from other components of the conference platform 10, the duration of the conference call and/or the duration of time that attendees spent on the call. The call duration software 124c can use such information to determine a duration value for the call, which can be provided to the call scoring software 124a for use in determining the engagement score.

Various methods can be used to determine the duration value. In some embodiments, the duration value is the length of time between the beginning and end of the conference call. In some variants, the duration value is based on the total duration of time of the attendees on the call. For example, if the call has one attendee who has been on the call for 1 minute, one attendee who has been on the call for 2 minutes, and one attendee who has been on the call for 3 minutes, then the duration value would be 6 minutes. In some embodiments, the duration value is determined based on an aggregation of the duration of the attendees on the call. For example, the duration value can be the median duration or mean duration of all the callers on the call (e.g., all the callers that are on the call at a given instant, or all of the callers over the course of the conference call). In some implementations, the duration value is compared to a threshold. For example, the duration value can increase if the duration of the call is greater than or equal to the threshold, such as 10 minutes, 30 minutes, 45 minutes, 1 hour, 2 hours, 4 hours, values between the aforementioned values, or other values. In some embodiments, the duration value decreases if the duration of the call is less than the threshold value, such as 2 minutes, 5 minutes, 10 minutes, values between the aforementioned values, or other values. In certain variants, the duration software 124c disregards call durations that are less than or equal to a certain amount, such as 10 seconds, 30 seconds, 1 minute, values between the aforementioned values, or other values.

Typically, the duration of the call begins no earlier than the beginning of the conference call. In other words, the duration value does not include time that a caller spends on hold (e.g., waiting for the conference call to begin). In some embodiments, the duration for an attendee is stopped unless the attendee takes an action to indicate he or she is still present on the call. For example, the attendee can be asked to press a key (e.g., on their phone) periodically, such as at least about every: 15 minutes, 30 minutes, 45 minutes, 1 hour, values between the aforementioned values, or other values.

C. Participation on the Call

In general, more participation by attendees on the conference call indicates more engaged attendees, and less participation indicates less engaged attendees. Thus, the engagement score can account for the amount and/or the type of participation. In this regard, the call participation software 124d can receive (e.g., from other components of the conference platform 10) information related to the participation of the attendees on the call. In some embodiments, the organizers 16 (e.g., administrator) inputs to the scoring unit 14 the various participation activities of the attendees. For example, the organizer can provide such information to the scoring unit 14 via the user interface. The call participation software 124d can use such information to determine a participation value for the call, which can be provided to the scoring software 124a for use in determining the engagement score.

1. Types of Participation

Generally, participation by an attendee includes any affirmative act that interfaces with the conference call and/or another person on the conference call. Some examples of participation are described below.

1a. Questions and Responses

Participation can include an attendee asking for a response. For example, an attendee asking a question (e.g., to the host of the call) can qualify as participation. Participation can also include an attendee indicating a desire to ask a question, such as by activating a "raise hand" option on the call.

Participation can also include an attendee providing a response. For example, participation can include an attendee answering a question, voting, or responding to a survey. In some variants, participation includes an attendee providing feedback, such as providing comments about the call or suggestions for future calls.

1b. Interfacing with an Associated Website or App

The conference call may have a related website or dedicated application ("an app") that displays information (e.g., slides, pictures, video, or other information) during the conference call. One or more attendees accessing such a website or app during the call can be another type of participation.

Participation can also be one or more attendees interfacing with the website or app. For example, an attendee entering a question or responding to a poll via the website or app (e.g., in addition to, or in place of, performing such an action on the conference call) can qualify as participation. In some embodiments, participation includes the attendee providing a location, such as by entering the attendee's location (e.g., providing a zip code) or by allowing access to the attendee's location data (e.g., permitting access to GPS data).

Various methods can be used to identify which attendees have accessed the website or app associated with the conference call. For example, the website or app can ask visitors to enter their phone number or other identifying information, and that information can be provided to the participation software 124*d*, which can cross-reference the provided information against the information of the attendees on the call. In some embodiments, the system can identify the caller by having the caller log-in via the website or app.

1c. Accessing Call Functions

In some embodiments, the participation includes actions by one or more attendees to educate themselves about the features of the conference call. For example, an attendee accessing a help or frequently asked questions menu, or completing some or all of a tutorial, can qualify as participation. This can indicate that the attendee is interested enough in the conference call to learn how to improve their experience and/or to try to solve a technical issue they may be experiencing. In some embodiments, the help menu, frequently asked questions menu, or tutorial is part of the scoring unit 14; in other embodiments, such features are on the program code 13.

Another type or participation involves an attendee taking an action to improve call quality. For example, the attendee can test his or her line for undesirable noise, such as the sound of breathing, using a testing function implemented by the conference platform 10. Typically, the test is done before the attendee joins the call, such as when the attendee is waiting on hold for the call to begin. This can allow the undesirable noise to be identified and remediated before the call begins, which can avoid the noise on the attendee's line from being propagated on the call. In some variants, the test is required for entry into the conference call. In other embodiments, the attendee signals a willingness to take part in the test, such as by pressing a key on the attendee's phone.

During the noise test, the attendee is asked not to speak, and the platform 10 records and/or analyzes the noise on the attendee's line. For example, the platform 10 can look for breathing noise on the line, background noise (e.g., a radio, wind, etc.), or other noise that would be undesirable if transmitted on the conference call. If the platform 10 determines that the attendee's line does not include undesirable noise, then the attendee can be provided a congratulatory message. If the platform 10 determines that the attendee's line includes undesirable noise, then the attendee can be provided a message indicating that undesirable noise has been detected on the attendee's line. Some embodiments play the attendee a portion of the recording of the attendee's line, which can aid the attendee in identifying the source of the noise. For example, this can help the attendee identify that his or her breathing is creating undesirable noise on the line.

1d. Inviting a Friend

In some embodiments, participation includes actions by one or more attendees to promote the conference call. For example, an attendee can invite another person to join the call (also called "inviting a friend"). In some such implementations, to invite the other person, the platform 10 provides functionality to permit the attendee to temporarily exit the conference call and be placed into a separate conference group to contact the prospective attendee. The attendee provides the prospective attendee's contact information (e.g., phone number) and the conference platform 10 provides a link between the line of the attendee and the line of the prospective attendee. This can allow the attendee to speak with the prospective attendee, such as to explain the topic of the call. The prospective attendee can then decide whether to join the conference call, such as by remaining on the line, or to hang-up. The attendee—and the prospective attendee if they have so decided—can then be joined to the conference call. For example, the attendee can provide a signal to the platform 10 (e.g., by pressing a key on the attendee's phone), after which the platform 10 rejoins the attendee to the conference call.

The invitation functionality described above can be provided in various ways. For example, such functionality can be provided by the call participation software 124*d* and/or the conference platform 10. In some implementations, the invitation functionality is provided by an invite unit (not shown) that communicates with the conference platform 10.

1e. Sub-Group Membership

In some embodiments, participation includes arranging or being a member of a subdivision (also called a "sub-group") within the overall group of attendees on the conference call. This can provide a semi-private group conversation within the context of the overall conference call conversation. Participating in such a sub-group can indicate increased interest in the call, and thus can suggest that the members of the sub-group will be more engaged.

Typically, the platform 10 allows members of a sub-group to communicate with each other, such as by speaking on the conference call. However, the communications of the sub-group members are not broadcast to all of the conference call attendees. For example, when an attendee in a sub-group makes a comment, the other members of the sub-group can hear the comment, but attendees not in the sub-group cannot hear the comment. Generally, the members of a sub-group can hear comments made by the organizers and by non-sub-group members. However, in certain other embodiments, the comments by non-sub-group members are muted for members of the sub-group.

In some implementations, the platform 10 allows the members of a sub-group to broadcast a comment outside the sub-group. This can allow members of the sub-group to interact with the organizers or non-sub-group members, while also allowing all of the attendees to hear such interaction. For example, if a member of a sub-group wants to ask a question to the host, the member signals a desire to the platform 10 to broadcast the question (e.g., by pressing a key on the member's phone) and asks the question, which is the platform 10 renders audible to all of the attendees. This can permit members of sub-groups to engage with the organizers, yet allow non-members of the sub-group to hear both the answer and the question.

The sub-group functionality can be implemented as an additional program module that runs on the platform 10. In other embodiments, such functionality is provided by the participation software 124d. In still other embodiments, the sub-group functionality can be provided by a sub-group unit (not shown) that communicates with the conference platform 10.

2. Determining the Participation Value

As noted above, the call participation software 124d can determine a participation value, which can be provided to the call scoring software 124a for use in determining the engagement score for the call. The participation value can be a function of the type of attendee participation, the amount of participation on the call, or a combination of both. For example, the participation value can be a function of whether the attendees engaged in participation activities, such as those described above (e.g., whether one or more attendees asked questions and/or provided responses, interfaced with a website or app associated with the conference call, accessed a help menu of the call or provided feedback, used the invite a friend functionality, and/or was a member of a sub-group) as well as how many and/or what type.

Typically, the greater the amount of participation on the call, the greater the attendee engagement. Thus, the participation value can be based on the total number of participation activities. For example, the participation value can increase with each question asked by an attendee and with each response provided by an attendee (e.g., to a poll). The participation value can increase with each instance of an attendee inviting another to join the conference and/or each time an attendee forms or joins a sub-group. In an example embodiment, if the call has one attendee who participated in 1 activity and three attendees who each participated in 3 activities, then the total participation value can be 10 activities. In some embodiments, the amount that the participation value can be modified by a single attendee is limited. This can reduce the chance of the participation value being skewed by one or a small number of overly enthusiastic attendees.

Moreover, a greater variety of participation activities by the attendees suggests a greater engagement of the attendees. Thus, the participation value can change (e.g., linearly or exponentially) as a function of the number of different participation activities by the attendees. For example, the participation value can vary a first amount when the number of different participation activities is at or between X and Y (e.g., 1 and 3), and can vary a second amount when the number of attendees is at or between X' and Y' (e.g., 4 and 6). In some implementations, the participation value increases with each different type of participation activity engaged-in by the attendees.

Furthermore, a greater number of attendees participating in the participating activities also may suggest a greater engagement of the attendees. This can also be described as the ratio of participating to non-participating callers. The participation value can be a function of the number of attendees that engage in at least a threshold number of participation activities, such as at least 1, 2, 3, 4, or more. For example, if the threshold is two, and the call has four attendees who each engage in 1 participation activity and one attendee who engages in 3 participation activities, then the participation value would be 3. In that same example, if an additional attendee joins and engages in 3 participation activities, then the participation value would be 6. In some variants, the participation value is modified by a multiplier (e.g., 1.5, 1.75, 2, 3, or other values).

D. Determining the Engagement Score for the Call

As discussed above, the call software 124b-d can provide values to the call scoring software 124a, which can use such values in determining the engagement score. For example, the scoring unit 14 can determine the engagement score based on an algorithm, such as:

$$ES=AV+DV+PV$$

Where ES is the engagement score, AV is the attendance value, DV is the duration value, and PV is the participation value.

In some implementations, certain aspects of the algorithm are weighed more heavily than others. For example, AV, DV, and/or PV can be modified by a multiplier. This can allow the algorithm to be modified to emphasize more desirable aspects. For example, if participation is more desirable than attendance or duration, the participation value can be varied by a multiplier that is greater than 1, such as 1.25, 1.5, 1.75, 2, or other values. Likewise, aspects that are deemed less significant can be deemphasized with a multiplier that is less than 1, such as 0.9, 0.8, 0.7, 0.5, or other values. For example, if attendance for a particular conference call is not considered to be important, then the attendance value can be modified by the multiplier of less than 1.

Various modifications of the algorithm indicated above are contemplated, as well as other algorithms for calculating an engagement score for the conference call based on the criteria described herein, or other criteria.

E. Outputting the Conference Call Engagement Score (FIG. 4)

The scoring unit 14 can output the engagement score, and other data, to other components of the conference platform 10 and/or the storage system 15. The platform 10 can communicate the engagement score to a graphical user interface accessible by the organizers. An example of such a graphical user interface 30 is shown in FIG. 4. As illustrated, the interface 30 can include a list of the attendees 32 and their respective durations on the call. For example, the interface 30 can list the phone numbers that the attendees have used to access the call. In some embodiments, the attendees can provide a name and/or the scoring unit 14 can correlate the phone number with a record that includes a name (e.g., a record of previous conference calls attended by that attendee).

As shown, the interface 30 can include information 34 about the call, such as the current time, elapsed time of the call, scheduled end time, and/or scheduled duration. The interface 30 can include information 34 related to the engagement score, such as an indicator 36 (e.g., a dial, numerical indicator, or otherwise) of the current engagement score. The interface 30 can include an indicator 38 of the engagement score over time, such as a graph. The interface 30 can include other information as well, such as a picture or video of the person speaking (e.g., the host), a noise meter displaying the level of noise on the conference call, or other information.

The graphical user interface 30 can allow organizers (e.g., the host) to view the engagement score for the call in substantially real time, which can aid the organizers in conducting the conference call. For example, if the engagement score for the call drops to or below a certain level, then an indicator can be triggered, such as a visual or audible alarm. This can notify the organizers of the low score value and/or can prompt them to try to increase the score, such as by moving to a different topic, encouraging attendees to participate, asking for audience feedback, or otherwise.

III. Determining an Engagement Score for Individual Attendees (FIGS. 5-8)

In some embodiments, the scoring unit 14 of FIGS. 1 and 2 can determine an engagement score for individual attendees on the conference call. This can provide feedback to the individual attendee on his or her level of engagement on the call. Such an attendee engagement score can also foster greater engagement by encouraging the attendee to increase his or her score. Thus, the engagement score can provide a competitive and/or game-like aspect to attending conference calls.

As illustrated in FIG. 5, the program code 24 of the scoring unit 14 can include individual scoring software 224a, individual attendance software 224b, individual duration software 224c, and individual participation software 224d. This can enable the scoring unit 14 to determine an engagement score for an attendee based on aspects of the attendee's interaction with the conference call, such as the attendee's attendance, the length of time the attendee is on the call, and the participation by the attendee on the call.

Similar to the determination of the call engagement score discussed above, the scoring unit 14 can receive inputs regarding a variety of information related to the attendee. Such information can be used by the scoring unit 14 to determine the attendee engagement score. For example, the scoring unit 14 can receive inputs related to the attendee's attendance (e.g., whether the attendee is a first-time attendee or a repeat attendee), duration (e.g., the time that the attendee was on the call), and/or participation (e.g., how and whether the attendee interfaced with the call, such as by asking questions, providing feedback or otherwise). Some of the information can be positive, which can positively impact the engagement score (e.g., the score can increase) and some of the information can be negative, which can negatively impact the engagement score (e.g., the engagement score can decrease). In determining an engagement score for an attendee, the scoring unit 14 can include any of the features and aspects discussed above in connection with determining an engagement score for the conference call.

Several example aspects that can be included in the attendee engagement score determination are discussed below.

A. Individual Attendance (FIGS. 5 and 6)

As noted above, the scoring unit 14 can include the individual attendance software 224b, which can determine an attendance value for use by the individual scoring software 224a in determining the engagement score. The attendance value can be affected by whether the attendee attends a given conference call. For example, the attendance value can increase when the attendee joins and/or completes a conference call. In some implementations, the attendance value is penalized (e.g., reduced) if the attendee misses a conference call to which he or she is invited. In determining the duration value, the individual attendance software 224b can include any of the features and aspects discussed above in connection with the call attendance software 124b.

After an attendee joins a conference call, the individual attendance software 224b can implement a method 40 to identify the attendee, discern whether the attendee is a first-time attendee or repeat attendee, and to retrieve a stored engagement score for the attendee. For example, as shown in FIG. 6, the attendance software 224b can receive (e.g., from other components of the conference platform 10) information related to the attendee. For example, in Block 42 the attendance software 224b can receive the phone number that the attendee is calling from, an identification number provided by the attendee, or other identifying information. In certain variants, the attendee is asked to speak his or her name, which is processed (e.g., with speech recognition software) and provided to the attendance software 224b as the identifying information.

The attendance software 224b can access the storage system 15 in Block 44, which can include records of attendees from previous conference calls. The attendance software 224b can ask whether a record exists for the present attendee in Block 46. For example, the attendance software 224b can attempt to match the identifying information of the present attendee with the identifying information in the records of previous attendees. If such a match exists, then the attendance software 224b determines that the present attendee is a repeat attendee. The method proceeds to Block 48 and the attendance software 224b receives the record (e.g., name and/or stored engagement score) with the matching identifying information.

If a record is not found with identifying information that matches the identifying information of the present attendee, then the attendance software 224b determines that the attendee is a first-time (e.g., new) attendee. The attendance software 224b creates a new record for the present attendee in Block 50.

As shown, in Block 52 the individual attendance software 224b updates the record (either the accessed record or the newly created record) with information from the present call. For example, the record can be updated to include the date and time that the attendee joined the present conference call. Moreover, the engagement score stored in the record can be updated to include the engagement score of the present call. The method then ends.

In certain implementations, the attendance value is affected by whether the attendee is a first-time attendee or a repeat attendee. For example, the attendance value can be a first value (e.g., 4) for a first-time attendee and a second value (e.g., 2) for a repeat attendee. Typically, a first-time attendee is provided a higher attendance value than a repeat attendee, which can help launch the attendee's engagement score.

In some embodiments, the attendance value is constant each time the attendee attends a conference call. For example, the attendance value can be 5. In some variants, the attendance value increases with subsequent conference call attendances. For example, for attending the first conference call the attendance value is 5, for attending the second conference call the attendance value is 10, for attending the third conference call the individual attendance value is 15, etc. This can encourage attendance by the attendee.

B. Individual Duration

The length in time that the attendee spends on the call can affect the attendee's engagement score. A longer duration can indicate an increased level of interest regarding the topic and/or organizer of the call, which can correlate to more engagement, and a shorter duration of the call can indicate a reduced level of interest regarding the topic and/or organizer of the call, which can suggest less engagement.

Generally, the individual duration software 224c determines or receives, from other components of the conference platform 10, the duration of time that the attendee is on the call. The duration is typically the time from when the attendee joins the conference (not including time the attendee waited on hold for the conference to begin) to the time the attendee hangs-up and/or the conference ends. The individual duration software 224c can use the duration information to determine a duration value for the call, which can be provided to the individual scoring software 224a for use in determining the engagement score. In determining the duration value, the individual duration software 224c can include any of the features and aspects discussed above in connection with the call duration software 124c.

In some embodiments, the duration value is the amount of time the attendee is on the conference call. For example, if the attendee has been on the call for 5 minutes 10 seconds, then the duration value is 5 minutes 10 seconds, or a related value (e.g., the 5 minute 10 second amount modified by a multiplier).

Alternatively, the duration value can be tied to a threshold. For example, the duration value can be a first amount (e.g., 0) up to a threshold amount of time and a second value (e.g., 10) after the threshold. In certain variants, to meet the threshold, the attendee needs to be on the call for a majority of the call. For example, the threshold can be the amount of time from the beginning to the midpoint of the conference call (e.g., the midpoint of the scheduled duration of the call). In some embodiments, the threshold is at least about: 1 minute, 5 minutes, 10 minutes, 30 minutes, values between the aforementioned values, or other values. In some implementations, the threshold is substantially the entire, or the entire, length of the conference call.

In yet a further alternative, the duration value can be a step function. For example, the duration value can be a first amount when the duration is at or between X and Y (e.g., 1 second and 60 seconds), can be a second amount when the duration is at or between X' and Y' (e.g., 1 minute and 14 minutes), and can be a third amount when the duration is at or between X" and Y" (e.g., 15 minutes and 1 hour).

In some embodiments, the duration for an attendee is stopped unless the attendee takes an action to indicate he or she is still present on the call. For example, the attendee can be asked to press a key (e.g., on their phone) periodically, such as at least about every: 15 minutes, 30 minutes, 45 minutes, 1 hour, values between the aforementioned values, or other values.

C. Individual Participation

The individual participation software 224d can determine or receive, from other components of the conference platform 10, information related to participation activities of the attendee on the conference call. Alternately, as noted above, participation information can be input to the scoring unit 14 by an organizer 16. The individual participation software 224d can use such information to determine a participation value for the attendee, which can be provided to the individual scoring software 224d for use in determining the engagement score.

In determining the participation value, the individual participation software 224d can include any of the features and aspects discussed above in connection with the call participation software 124d. For example, the participation value can increase with each question asked by the attendee and with each response provided by the attendee (e.g., to a poll). The participation value can increase each time the attendee invites another to join the conference and/or each time the attendee forms or joins a sub-group. In some embodiments, the amount that the participation value can be modified by the attendee's participation is limited, such as being capped at a maximum value. This can reduce the chance of the attendee manipulating the participation value by repeatedly engaging in participation activities (e.g., trying to increase the participation value by repeatedly accessing the help menu or repeatedly accessing an associated website or app).

In some embodiments, the participation value is affected by the method by which the attendee accesses the call. For example, the participation value can be higher if the attendee accesses the conference call via a computer, such as via a website for the conference call or via a voice over internet protocol phone. Such computer-based accessing of the call can be beneficial because it can provide additional information about the attendee, such as the attendee's IP address, geographic location, or other information.

D. Determining the Engagement Score for the Attendee

As previously described, the attendee software 224b-d can provide values to the individual scoring software 224a, which can determine the engagement score for the attendee. For example, the scoring unit 14 can determine the engagement score based on an algorithm, such as:

$$ES=AV+DV+PV$$

Where ES is the engagement score, AV is the attendance value, DV is duration value, and PV is the participation value. As discussed above, one or more of the values can be modified (e.g., with a multiplier) to increase or decrease its effect on the engagement score.

In some embodiments, determining the engagement score is determined based on certain actions by the attendee related to the call. For example, the engagement score can be based on the following algorithm:

$$ES = \frac{1}{4}D + 3Q + 25J + 10SG$$

Where ES is the engagement score, D is the duration in minutes that the attendee attended the conference call, Q is the number of questions asked by the attendee during the conference call, J is a whether the attendee invited another to join (yes=1, no=0), and SG is whether the attendee formed a sub-group in the call (yes=1, no=0).

In certain embodiments, the individual engagement score is based solely or primarily on all of the conference calls the attendee has attended (and for which engagement data is readily accessible by the platform 10). In other embodiments, the engagement score is determined, solely or primarily, on the attendee's engagement on less than all of the conference calls the attendee has attended. For example, some implementations determine the score based solely or primarily on the attendee's engagement on the current call. Certain variants determine the score based solely or primarily on the activity occurring over a limited time window, such as on the attendee's engagement with the call during approximately the most-recent: 15 seconds, 30 seconds, 1 minute, 2 minutes, 5 minutes, 10 minutes, values between the aforementioned values, and other values. Other implementations determine the score based solely or primarily on the attendee's engagement on calls that occurred in the last 30 days or month, current calendar year, or last rolling year's time (e.g., the last 365 or 366 days).

In some implementations, the platform 10 can determine multiple engagement scores for a single individual. For example the platform 10 can determine a present engagement score and/or an aggregate engagement score. The present engagement score can be the engagement score of the present (e.g., most recent) conference call only. The aggregate engagement score can be based on the engagement score of the present conference call as well as the engagement score of previous conference calls. For example, the aggregate engagement score can be an average of the individual's engagement scores. The system can maintain records of event-specific (e.g., present) and/or aggregate scores for specific individuals, such as in the storage system 15.

Various modifications of the algorithms indicated above are contemplated, as well as other algorithms for calculating an engagement score for the attendee based on the criteria described herein, or other criteria.

E. Outputting the Attendee Engagement Score (FIGS. 7 and 8)

The scoring unit 14 can output the engagement score, and other data, to the conference platform 10 and/or the storage system 15. For example, the scoring unit 14 can output the engagement score to the conference platform 10, which in turn can communicate the engagement score to the attendee, such as via an email or text message.

Figure 7:
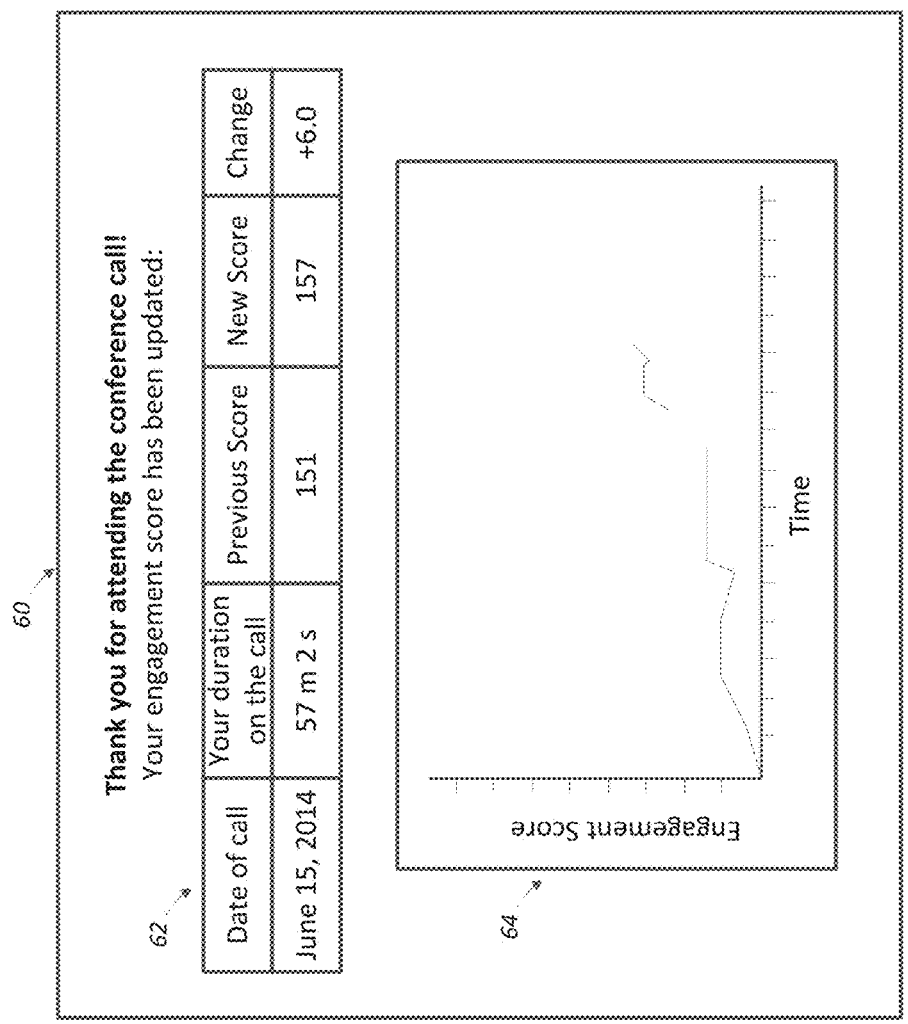
FIG. 7 illustrates another example graphical user interface that receives an output from the scoring unit of FIG. 2.
Figure 8:
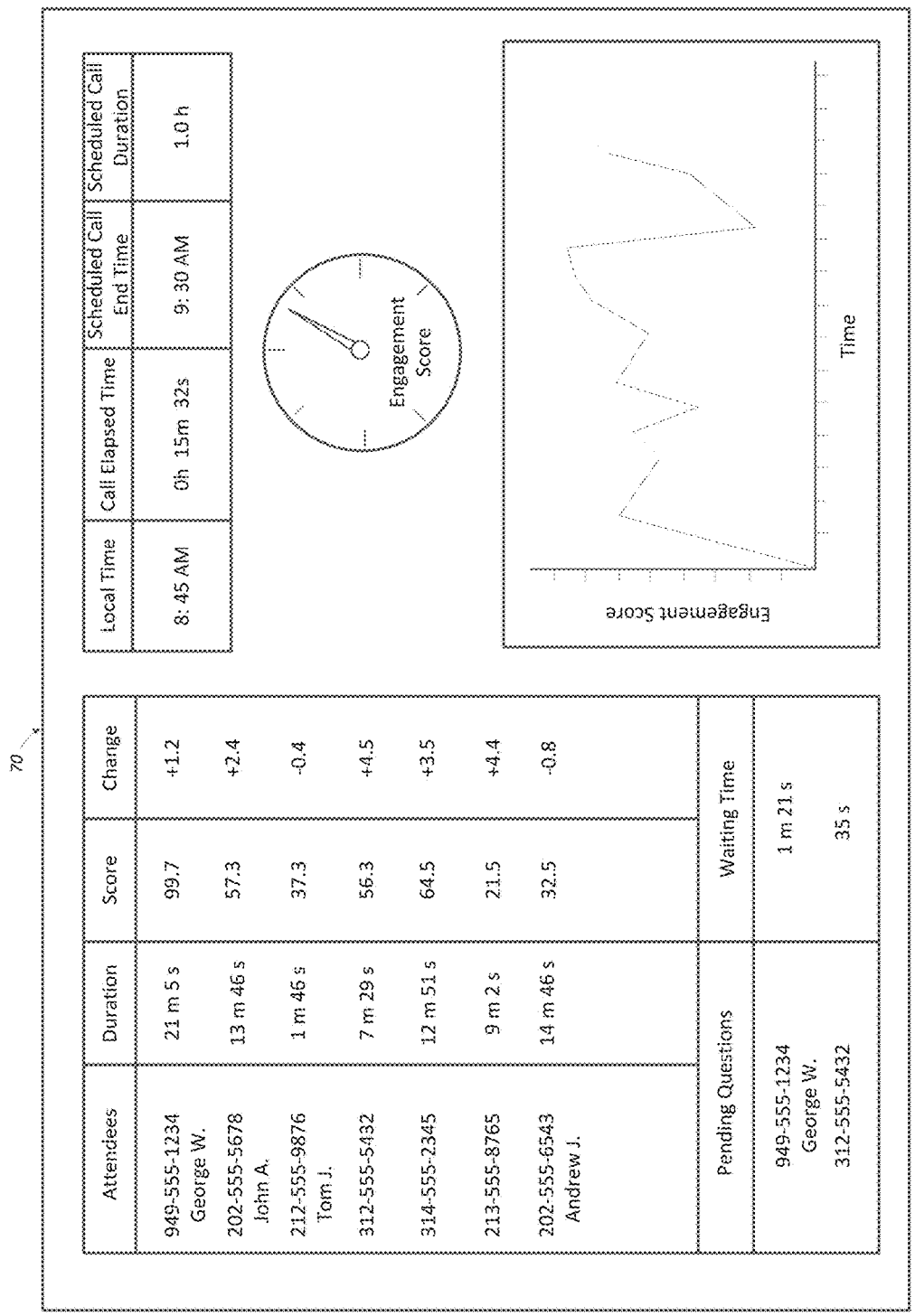
FIG. 8 illustrates yet another example graphical user interface that receives an output from the scoring unit of FIG. 2.

In some embodiments, the engagement score is output to a graphical user interface 60 accessible by the attendee, such as is shown in FIG. 7. For example, the interface can be accessible via a standard web browser and/or via the app associated with the conference call. The interface can include information related to the call 62, such as the date and the attendee's duration on the call. The interface 60 can also indicate the engagement score, such as the previous score (e.g., the score before the present conference call), the current score (e.g., the score after the present conference call), and the change in the score. As shown, the interface 60 can include a graphical representation 64 of the attendee's engagement score, such as a graph (e.g., score vs. time) or a dial (not shown). In some embodiments, the interface displays an award after the attendee's engagement score has reached certain levels. For example, upon reaching an engagement score of 100, the attendee is given a medal, star, or other award indicator. In some embodiments, the interface 60 includes functionality to enable the attendee to share details of the conference call (e.g., the topic) and/or their engagement score. For example, such information can be shared via email or text message, by social media, or otherwise.

In certain implementations, the engagement score for the attendee, as well as for other attendees, can be provided to the organizers of the call. For example, such scores can be displayed on a graphical user interface 70 for the organizers, such as is shown in FIG. 8. The example user interface shown in FIG. 8 is similar to the user interface of FIG. 4, with the addition of information related to the scores of the individual attendees displayed as well. Providing such attendee scores to the organizers can aid the organizers in conducting the call, such as in prioritizing the order in which to address questions. For example, attendees with a higher engagement score may be prioritized over attendees with a lower engagement score.

As shown, the attendee engagement score can be used to select and/or rank the attendees. In some embodiments, such selection and/or ranking is used to determine invitations to attend future calls. For example, the scoring unit 14 can automatically prioritize the attendees having the highest cumulative or aggregate engagement scores and provide invitations to those attendees to attend one or more future conference calls. This can increase the likelihood of having one or more engaged attendees during the future calls. In various embodiments, invitations are sent to at least the attendees with engagement scores that are at least the highest: one, two, three, four, five, ten, twenty, or values between the aforementioned values, or other values. For example, in some implementations, invitations are sent to the attendee with the highest engagement score, the attendee with the second-highest engagement score, and the attendee with the third-highest engagement score.

Typically, the user interface 70, in conjunction with the platform 10, permits the engagement score to be sorted based on various criteria. For example, the engagement score can be sorted based on value, such as highest to lowest, lowest to highest, etc. In some embodiments, the platform 10 sorts, and the user interface 70 displays, the engagement scores using demographic data supplied by the individual callers to the platform 10. This can allow generation and display of different engagement scores based on the demographic groups of call participants, such as location (e.g., state, zip code, area code, political district, etc.), sex, race (e.g., Caucasian, Latino, African-American, etc.) political affiliation and/or leaning (e.g., democratic, republican, independent, etc.), voter status (e.g., registered-voter, non-registered voter, etc.), caller type (e.g., first-time caller, repeat caller, etc.), and/or otherwise.

IV. Other Features

For purposes of presentation, the conference platform 10 is discussed above with the engagement score for the conference call and the engagement score for an individual attendee described separately. However, in various embodiments the platform 10 can determine an engagement score for both the conference call and some or all of the individual attendees. The program code 24 of the scoring unit 14 can include any combination of the software 124*a-d* and 224*a-d*.

Any of the features described in this specification may be implemented by the conference platform 10 through executable program code executed by the platform 10. The conference platform 10 can include one or more computers or computing devices that implement the various functions described herein under the control of software stored on one or more non-transitory computer storage devices, such as hard disk drives, solid state memory devices, etc. Each such computer or computing device typically includes a hardware processor and a memory. Where the system includes multiple computing devices, these devices may, but need not, be co-located. In some cases, the scoring unit 14 may be implemented on cloud-based or shared computing resources that are allocated dynamically. The processes and algorithms described herein may alternatively be implemented partially or wholly in application-specific circuitry, such as Application Specific Integrated Circuits and Programmable Gate Array devices. The results of the disclosed processes and process steps may be stored, persistently or otherwise, in any type of non-transitory computer storage, such as volatile or non-volatile storage.

Some embodiments of the conference platform 10 include a transcription unit (not shown). The transcription unit can receive signals from other components of the platform 10 indicative of the verbal conversation during the call. The transcription unit can include voice recognition functionality to facilitate transcription of such conversation. Further, the transcription unit can include timing functionality to provide time-correlated (e.g., time-stamped) transcription.

In some embodiments, the conference platform 10 includes a correlating unit (not shown). The correlating unit can determine one or more relationships between the transcription and the engagement score. For example, the correlating unit can determine one or more keywords (e.g., repeated words) that were said around the time of a peak and/or valley in the engagement score for the call. This can aid the organizers in determining topics that are engaging and those that are not. For example, the correlating unit can determine that term X (e.g., "civil rights," "America," "guns," etc.) was said within Y seconds (e.g., less than or equal to about: 5, 10, 15, 20, 30, 60, or other values) of a peak and/or a valley in the engagement score for the call. In some embodiments, the correlating unit determines keywords said around the time (e.g., less than or equal to 10 seconds from) that certain actions occurred, such as at least 5% of the attendees exiting the call, multiple questions being asked, or other actions. The correlation unit can provide the correlation findings to the organizers, such as via the graphical user interface.

Similarly, the correlating unit can determine certain keywords that were said during peaks and/or valleys in the engagement score for an individual attendee. This can aid in determining topics the attendee found engaging. Such correlation for an individual attendee can be provided to the organizers and/or can be stored in the storage system 15 (e.g., in the record for the attendee). This can allow the attendee-specific correlation findings to be accessed by the organizers of future conference calls.

In some embodiments, the attendees of the conference call can interact with the conference call via a chat function. For example, attendees can provide (e.g., by sending text messages, emails, or accessing a chat program) questions or comments during the call, which are displayed as text, such as on the graphical user interface 30, 60, 70. Thus, the chat can be another type of group conversation in addition to, or in lieu of, the conference call. In some embodiments, the platform 10 can determine keywords in the chat. This can enable the platform 10 to determine popular and/or trending topics in the chat. Such topics can be provided to the organizers 16, which can aid in conducting the call. In some embodiments, the correlating unit can correlate keywords in text in the chat with peaks and/or valleys in the engagement score of the call and/or the engagement score for individual attendees.

In some implementations, the platform 10 can analyze the chats of an individual attendee. For example, the platform 10 can perform spell-checking on the attendee's chats and/or can analyze the words used in the attendee's chat (e.g., for word length, complexity, or otherwise). The scoring unit 14 can use such information to predict characteristics of the attendee, such as age, education, location, or otherwise. In certain implementations, the platform 10 can use such information to estimate a desirability rating for the attendee. For example, an attendee who spells correctly and/or uses words having an average length of at least 6 letters can be more desirable than a person who does not meet those characteristics.

V. Summary

Although certain systems and methods have been disclosed in the context of certain embodiments and examples, it will be understood by those skilled in the art that the systems and methods extend beyond the specifically disclosed embodiments to other alternative embodiments and/or uses of the embodiments and certain modifications and equivalents thereof. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Some embodiments have been described in connection with the accompanying drawings. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of conference calling systems and methods have been disclosed. Although the systems and methods have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

The following is claimed:

1. A conference call management system, comprising:
   a call processing system comprising one or more computing devices, said call processing system comprising telecommunication hardware configured to initiate and process telephonic calls, including conference calls, and comprising a processor and a memory, said call processing system programmed with at least:
      a conference call management module that provides functionality for initiating a conference call and for enabling conference call participants to interactively participate on the conference call, said conference call management module configured to monitor, and maintain participant-specific records of, the interactive participation by the participants;
      a scoring module configured to use at least the participant-specific records of interactive participation to generate participant-specific engagement scores reflective of levels of engagement of the participants on the conference call; and
      a ranking module configured to rank participant-submitted requests for consideration based on the participant specific engagement scores.

2. The conference call management system of claim 1, wherein the scoring module is further configured to use the records to generate a non-participant-specific engagement score reflective of an overall level of engagement on the conference call by a plurality of participants.

3. The conference call management system of claim 1, wherein the scoring module is further configured to use the records, in combination with demographic data of participants, to generate a non-participant-specific engagement score reflective of a level with which participants having a particular demographic attribute engage on the conference call.

4. Non-transitory computer storage having stored thereon executable program code that directs a computer system to implement a process that comprises:
   receiving, from a conference call bridge system, information indicating that a caller is attending a present conference call;
   accessing a storage system that comprises a list of callers from previous conference calls and a list of corresponding past engagement scores for the callers;
   retrieving, from the storage system, the past engagement score for the caller;
   receiving, from the conference call bridge system, information related to actions of the caller during the present conference call;
   determining, based on the information, a present engagement score for the caller for the present conference call;
   determining an updated engagement score based on the past engagement score and the present engagement score;
   recording the updated engagement score on the storage system; and
   determining whether to invite the caller to attend a subsequent conference call based on the updated engagement score or the present engagement score.

5. The storage of claim 4, wherein recording the updated engagement score on the storage system comprises replacing the past engagement score with the updated engagement score.

6. The storage of claim 4, further comprising:
   determining whether the caller is on the list on the storage system;
   in response to determining the caller is not on the list, updating the list to include the caller; and
   in determining an updated engagement score, using a past engagement score of zero.

7. The storage of claim 4, wherein determining the updated engagement score comprises adding the past engagement score and the present engagement score.

8. The storage of claim 4, wherein the information related to actions of the caller comprises the length of time the caller attended the present conference call.

9. The storage of claim 4, wherein the information related to actions of the caller comprises whether the caller asked a question on the call.

10. The storage of claim 4, wherein the information related to actions of the caller comprises whether the caller accessed a help menu for the conference call.

11. A teleconference bridge system for linking a plurality of telephone calls to provide conference call functionality, the system adapted to determine an objective evaluation for a present conference call, the system comprising:
   a non-transitory storage that stores data related to attendees of prior conference calls; and
   a computing system comprising one or more computing devices, the computing system in communication with the non-transitory storage and programmed to:
      receive, from a conference call bridge system, information related to actions of a plurality of callers during a conference call;
      determine, based on the information, an engagement score for the conference call;
      output the engagement score to a graphical user interface for viewing by an organizer of the conference call;
      record the engagement score on the non-transitory storage; and
      invite one or more callers of the plurality of callers to attend a subsequent conference call based at least partly on the information related to actions of the plurality of callers during the conference call.

12. The system of claim 11, wherein the information related to actions of a plurality of callers during the conference call comprises the median length of time an individual caller of the plurality of callers remained on the conference call.

13. The system of claim 11, wherein outputting the engagement score to a graphical user interface comprises providing a chart of the engagement score versus time.

14. The system of claim 13, wherein the chart is provided in substantially real time during the conference call.

15. The system of claim 11, wherein the computing system is further programmed to:
   identify the highest and lowest engagement scores during the conference call; and
   output, to the graphical user interface:
      the highest and lowest engagement scores; and
      the times during the conference call that the highest and lowest engagement scores occurred.

16. The system of claim 15, wherein the computing system is further programmed to:
- record, on the storage system, audio of the conference call;
- identify a portion of the audio that corresponds to the highest engagement and another portion of the audio that corresponds to the lowest engagement score; and
- output the portions of the audio.

17. The system of claim 15, wherein the computing system is further programmed to:
- transcribe the conference call;
- correlate the transcription to time duration of the conference call;
- determine the times during the conference call that the highest and lowest engagement scores occurred; and
- identify, from the transcription, keywords within 1 minute of the time of the highest and lowest engagement scores.

18. The system of claim 11, wherein the computing system is further programmed to determine, based on the information, an attendee engagement score for each of the plurality of callers.

19. The system of claim 18, wherein the computing system is further programmed to:
- receive an indication that one or more of the callers has a pending questions; and
- automatically rank the one or more callers based on each caller's attendee engagement score.

20. The conference call management system of claim 1, wherein the participant-submitted requests comprise requests to ask a question on the conference call.

* * * * *